(12) United States Patent
Li et al.

(10) Patent No.: US 11,354,165 B1
(45) Date of Patent: Jun. 7, 2022

(54) AUTOMATED CLUSTER EXECUTION SUPPORT FOR DIVERSE CODE SOURCES

(71) Applicant: Workday, Inc., Pleasanton, CA (US)

(72) Inventors: Zhenqi Li, San Ramon, CA (US);
Liang Huang, San Leandro, CA (US);
Lei Gao, Pleasanton, CA (US); Luis Medina, Pleasanton, CA (US)

(73) Assignee: Workday, Inc., Pleasanton, CA (US)

( * ) Notice: Subject to any disclaimer, the term of this patent is extended or adjusted under 35 U.S.C. 154(b) by 151 days.

(21) Appl. No.: 15/649,547

(22) Filed: Jul. 13, 2017

(51) Int. Cl.
*G06F 9/50* (2006.01)
*G06F 9/455* (2018.01)
*G06F 9/48* (2006.01)

(52) U.S. Cl.
CPC ............ *G06F 9/5061* (2013.01); *G06F 9/455* (2013.01); *G06F 9/485* (2013.01); *G06F 2209/505* (2013.01)

(58) Field of Classification Search
None
See application file for complete search history.

(56) References Cited

U.S. PATENT DOCUMENTS

| | | | | |
|---|---|---|---|---|
| 6,260,078 | B1 * | 7/2001 | Fowlow ................... | G06F 9/445 717/118 |
| 6,480,877 | B1 * | 11/2002 | O'Donnell ............ | G06F 9/4843 718/100 |
| 6,912,576 | B1 * | 6/2005 | Rustagi ................... | H04L 29/06 370/252 |
| 2004/0261065 | A1 * | 12/2004 | Abrams .................... | G06F 8/47 717/140 |
| 2010/0005249 | A1 * | 1/2010 | Bates .................. | G06F 11/3624 711/154 |
| 2010/0241698 | A1 * | 9/2010 | Hillerbrand ............. | G06F 16/13 709/203 |
| 2011/0093864 | A1 * | 4/2011 | Wood ...................... | G06F 9/541 719/313 |
| 2013/0160018 | A1 * | 6/2013 | Kang ........................ | G06F 9/50 718/103 |
| 2014/0366033 | A1 * | 12/2014 | Nystad ...................... | G06F 9/50 718/104 |
| 2016/0098254 | A1 * | 4/2016 | Paternostro ......... | G06F 9/44589 717/105 |
| 2016/0179481 | A1 * | 6/2016 | Ohara ................... | G06F 16/252 717/109 |
| 2017/0123810 | A1 * | 5/2017 | Marathe ................ | G06F 9/4405 |

(Continued)

*Primary Examiner* — Wynuel S Aquino
(74) *Attorney, Agent, or Firm* — Van Pelt, Yi & James LLP (57) ABSTRACT

A system for automated cluster execution support includes and interface, a linking storage system, and a processor. The interface is configured to receive a first code segment in a first coding language; receive a second code segment in a second coding language; and receive a connector indication, wherein the connector indication indicates that intermediate state data that is output from the first code segment is used as input to the second code segment. The processor is configured to cause execution of the first code segment, wherein executing the first code segment includes executing an output method using the first coding language to store the intermediate state data in the linking storage system; and cause execution of the second code segment, wherein executing the second code segment includes executing an input method using the second coding language to read the intermediate state from the linking storage system.

22 Claims, 9 Drawing Sheets

(56) References Cited

U.S. PATENT DOCUMENTS

| | | | | |
|---|---|---|---|---|
| 2017/0139690 | A1* | 5/2017 | Pesarese | G06F 8/41 |
| 2017/0228264 | A1* | 8/2017 | Boyter | G06F 11/3668 |
| 2017/0242673 | A1* | 8/2017 | Catalano | G06F 9/541 |
| 2017/0351789 | A1* | 12/2017 | Szpak | G06F 17/509 |
| 2018/0081642 | A1* | 3/2018 | Alurralde Iturri | G06F 8/35 |
| 2018/0107463 | A1* | 4/2018 | Heilbrunn | G06F 21/563 |
| 2018/0189035 | A1* | 7/2018 | Narang | G06F 8/24 |
| 2018/0365082 | A1* | 12/2018 | Richardson | G06F 9/541 |
| 2019/0004776 | A1* | 1/2019 | MacLennan | G06F 8/47 |

\* cited by examiner

Data Table                                                500

|       | Name     | Title      | Age | $ Pay / hr |
|-------|----------|------------|-----|------------|
| Row 1 | Theodore | Dishwasher | 25  | 9          |
| Row 2 | William  | Busser     | 22  | 9          |
| Row 3 | Woodrow  | Line Cook  | 31  | 10         |
| Row 4 | Warren   | Waiter     | 26  | 10         |
| Row 5 | Calvin   | Maitre D'  | 34  | 12         |
| Row 6 | Herbert  | Head Chef  | 39  | 15         |
| Row 7 | Franklin | Expeditor  | 29  | 15         |

| Flow Context Object Description |
|---|
| Attributes<br><br>    data_frames: array of data frames<br><br>    variables: dictionary of key / value pairs<br><br>    input_path: directory of input data collected by input method<br><br>    output_path: directory of output data to be provided by output method<br>    report_path: directory of report data to be provided by a report method |
| Methods<br><br>    get_variable(var_name): return the value for key var_name<br><br>    set_variable(var_name, var_value): set the value for key var_name to value var_value<br><br>    read(sep=','): read data and variables from input_path using sep as a field delimeter<br><br>    write(data_frame, filename, sep=','): write data_frame to output data file filename in output_path using sep as a field delimeter<br><br>    write_report(data_frame, filename, sep=','): write data_frame to output data file filename in report_path using sep as a field delimeter<br><br>    write_variables(filename): write variables to filename |

AUTOMATED CLUSTER EXECUTION SUPPORT FOR DIVERSE CODE SOURCES

BACKGROUND OF THE INVENTION

Processing of large data sets (e.g., "big data") is typically performed on a cluster computing system requiring complex programming for defining the data processing and the division of the job across the cluster computers. Experts in data analysis are typically comfortable using scripting or analysis programming languages (e.g., Python™ or R) but not the more technical languages necessary for controlling the cluster (e.g., Java™). In addition, different languages are more appropriate for different programming tasks, leading a data analyst to desire to write one part of a job in a first language and a second part of the job in a second language. Requiring a cluster computing job to be programmed only in a single more technical language creates a problem where the experts in data analysis are not able to write the code that they need.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for automated cluster execution support comprises an interface configured to receive a first code segment in a first coding language, receive a second code segment in a second coding language, and receive a connector indication, wherein the connector indication indicates that intermediate state data that is output from the first code segment is used as input to the second code segment. The system for automated cluster execution support additionally comprises a linking storage system. The system for automated cluster execution support additionally comprises a processor configured to execute the first code segment, wherein executing the first code segment includes executing an output method using the first coding language to store the intermediate state data in the linking storage system, and execute the second code segment, wherein executing the second code segment includes executing an input method using the second coding language to read the intermediate state from the linking storage system. In some embodiments, the system for automated cluster execution support additionally comprises a memory coupled to the processor and configured to provide the processor with instructions.

Automated cluster execution support for diverse code sources is disclosed. A system for automated cluster execution support for diverse code sources comprises a system for executing code fragments using a cluster system. A code fragment comprises a computer program for accomplishing a data processing task. A data analyst may create a set of code fragments for accomplishing each of a set of common data processing tasks (e.g., loading data, cleaning data, transforming data, processing data, outputting data, etc.). The code fragments may be written in the most appropriate of a set of data processing programming languages (e.g., python, R, hive, scala, or a shell scripting language—for example, sh, bash, etc.). The system for automated cluster execution support comprises a flow builder for constructing a flow from the code fragments to build a full data processing system. The flow builder assembles a flow from a set of code fragments. Data is output from code fragments and received by other code fragments. The system for automated cluster execution support implements a flow application programming interface (e.g., an API) for storing data from a first code fragment and reading data to a second code fragment. The flow API is implemented as a flow object in each supported programming language. Code in the code fragment interacts with the flow object to read input data (e.g., from a previous code fragment) and write output data (e.g., to be read by the next code fragment). Intermediate output data written by a code fragment using the flow object is stored as a data table (e.g., in comma-separated value—for example, comma separated values (CSV) format). The flow builder is capable of routing the output from one code fragment to the input of a next code fragment, forking the output from one code fragment to be the input of two different code fragments (e.g., that will run in parallel), joining the output of two code fragments as the input to one code fragment, or routing the inputs and outputs of code fragments in any other appropriate way.

Figure 1:
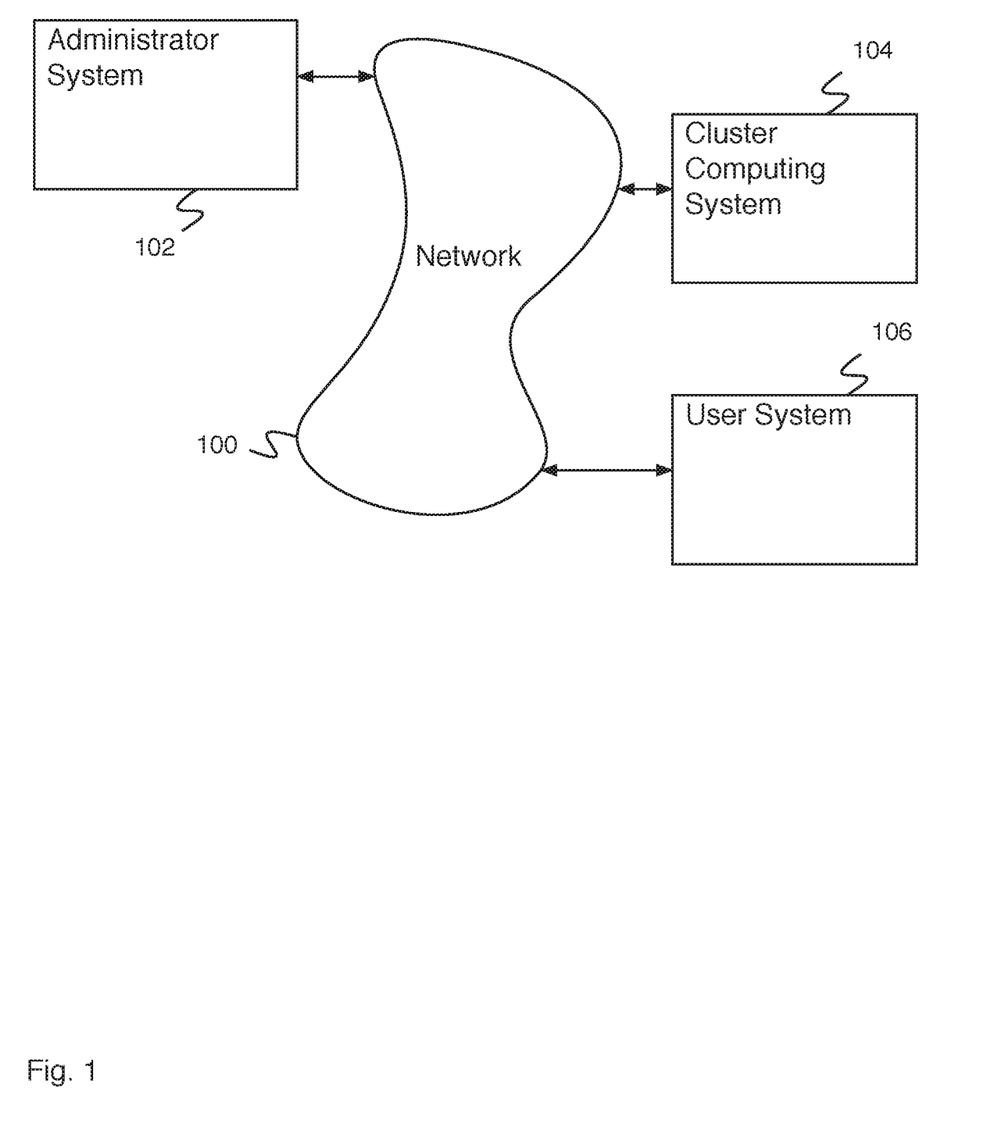
FIG. 1 is a block diagram illustrating an embodiment of a network system.

FIG. 1 is a block diagram illustrating an embodiment of a network system. In the example shown, a user using user system 106 accesses cluster computing software on cluster computing system 104 to perform data analyses. The user is able to build custom data analysis software utilizing a framework that is a part of the system for automated cluster execution support for diverse code sources executing on cluster computing system 104. The system for automated cluster execution support for diverse code sources enables the user to combine code segments written using diverse coding languages in any way desired. Enabling the user to combine code segments allows code segments that perform specific functions (e.g., acquiring data from a database, cleaning data, performing a mathematical transform, etc.) to be written in the coding language that is most appropriate for the function, and allows code to be reused more easily. A user accessing cluster computing system 104 to build custom data analysis software using the system for automated cluster execution support for diverse code sources first acquires and/or creates a set of code segments. The code segments comprise reused code segments—for example, code segments previously used by a co-worker, code segments retrieved from an internal database of code segments, code segments found on the Internet, etc.—or new code segments created by the user. The code segments are individually debugged to ensure correct functionality. The user then uses the system for automated cluster execution support for diverse code sources to assemble the code segments into a completed data analysis tool. The code segments are arranged in any pattern desired by the user and may be written in any combination of coding languages supported by the system. The completed data analysis tool can then be run once, run continually, run at scheduled times, etc.

Cluster computing system 104 receives a first code segment in a first coding language, a second coding segment in a second coding language, and a connector indication, wherein the connector indication indicates that intermediate state data that is output from the first code segment is used as input to the second code segment. The first code segment, the second code segment, and the connector indication are received from a user using user system 106. The connector indication comprises a description of a code segment arrangement (e.g., order of execution of code segments, data flow from segment to segment, etc.). A user using user system 106 can provide the connector indication directly or interact with cluster computing system 104 to create a connector indication (e.g., using a connector indication creation tool, using a command line interface, using a graphical user interface, etc.).

A cluster master system of cluster computing system 104 uses the first code segment, the second code segment, and the connector indication to build a code segment flow. The code segment flow comprises an indication of an order for executing the first code segment and the second code segment and an indication of intermediate state data to be received as output from the first code segment and used as input to the second code segment. The intermediate data is to be stored by cluster computing system 104 using a linking storage system. When cluster computing system 104 receives an indication to execute the code segment flow—for example, directly from a user using a user system 106 or as scheduled by a user using a user system 106—the cluster master system begins executing the flow. The cluster master system directs a first one or more cluster worker systems to execute the first code segment, wherein executing the first code segment includes executing an output method using the first coding language to store the intermediate state data in the linking storage system. Directing the first one or more cluster worker systems to execute the first code segment comprises transferring the first code segment or a compiled version of the first code segment from the cluster master system to the first one or more cluster worker systems. An output data set is created by the first one or more cluster worker systems, transferred to the linking storage system, and stored by the linking storage system. The cluster master system then directs a second one or more cluster worker systems to execute the second code segment, wherein executing the second code segment includes executing an input method using the second coding language to read the intermediate state data from the linking storage system. Directing the second one or more cluster worker systems to execute the second code segment comprises transferring the second code segment or a compiled version of the second code segment from the cluster master system to the second one or more cluster worker systems. The second one or more cluster worker systems are directed by the second code segment to access the output data set created by the first one or more cluster worker system and stored by the linking storage system. The output data set is transferred from the linking storage system to the second one or more cluster worker systems and the second code segment is executed. Output data created by the second one or more cluster worker systems is transferred to the cluster master system. The cluster master system performs any necessary data combining to create a code segment flow output and provides the code segment flow output—for example, to the user using user system 106.

The network system of FIG. 1 comprises a system for executing a job using a cluster system. An administrator using administrator system 102 communicates with cluster computing system 104 via network 100. The administrator installs, configures, and maintains cluster computing software on cluster computing system 104. Cluster computing software on cluster computing system 104 includes prefabricated software for performing standard data analyses as well as a framework for allowing a user to build custom data analysis software. The framework for custom software includes a system for automated cluster execution support for diverse code sources. A user using user system 106 communicates with cluster computing system 104 via network 100.

In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, cluster computing system 104, and user system 106 communicate via network 100. In the example shown, administrator system 102 comprises an administrator system for use by an administrator. In various embodiments, administrator system 102 comprises an administrator system for executing administrator commands, for executing jobs using cluster computing system 104, for executing a streaming query on cluster computing system 104, for querying the status of jobs on cluster computing system 104, or for any other appropriate administrator system purpose. Cluster computing system 104 comprises a cluster computing system for executing cluster computing jobs. In some embodiments, cluster computing system 104 comprises a cluster computing system for automated cluster execution support for diverse code sources. In various embodiments, cluster computing system 104 comprises a computer, a multiprocessor computer, a plurality of computers, a plurality of multiprocessor computers, or any other appropriate cluster computing system. In some embodiments, cluster computing system 104 comprises a plurality of individual cluster systems. User system 106 comprises a user system for use by a cluster system user. In some embodiments, a cluster system user comprises a user executing data processing jobs using the cluster system. In various embodiments, a cluster system user comprises a data analyst, a data scientist, a big data user, a cluster system customer, or any other appropriate cluster system user.

Figure 2:
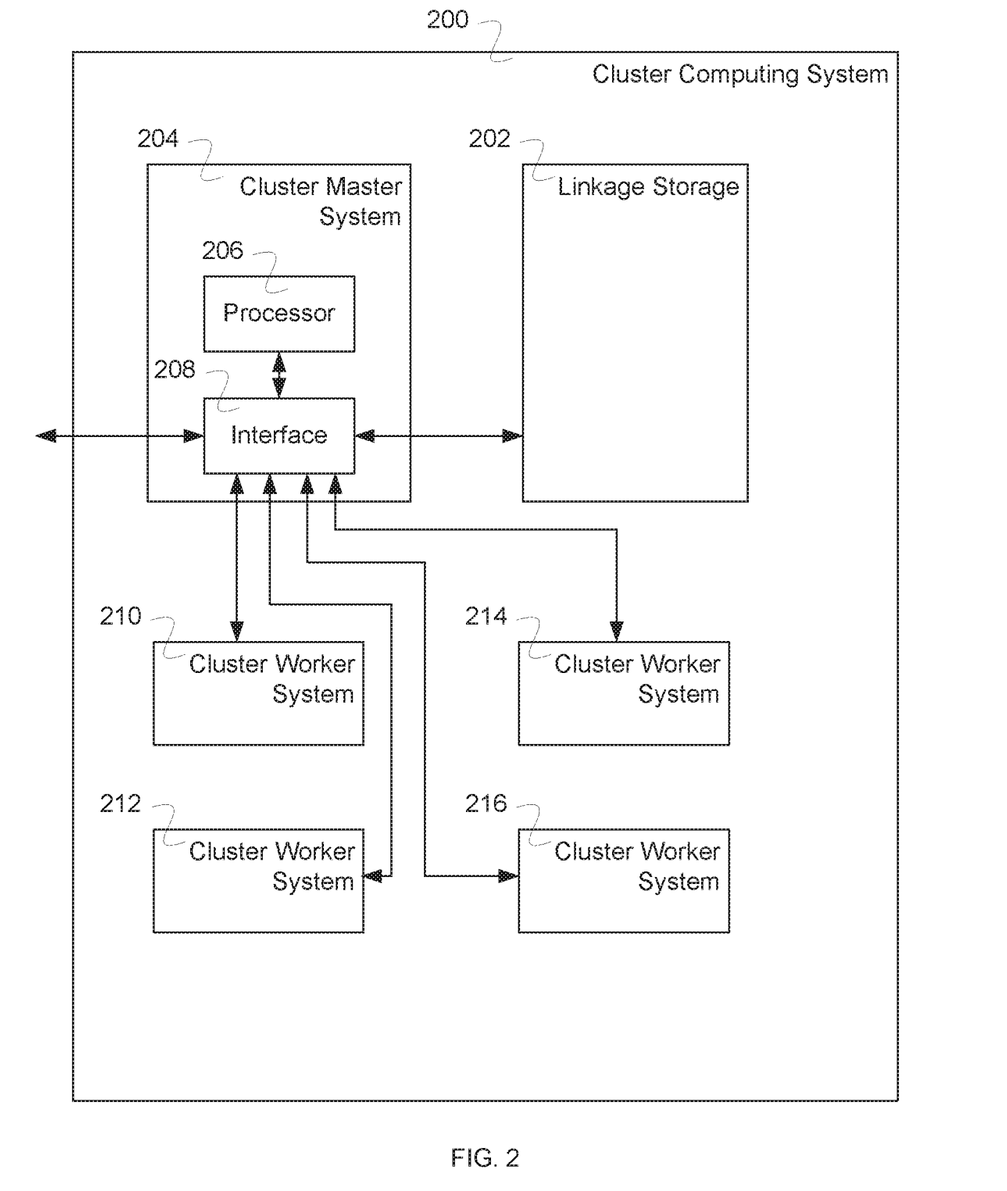
FIG. 2 is a block diagram illustrating an embodiment of a cluster computing system.

FIG. 2 is a block diagram illustrating an embodiment of a cluster computing system. In some embodiments, cluster computing system 200 comprises cluster computing system 104 of FIG. 1. In the example shown, cluster computing system 200 receives code segments and linking instructions. Cluster master system 204 receives code segments and linking instructions via interface 208. Cluster master system 204 using processor 206 causes the code segments to execute using a cluster worker system (e.g., using cluster worker system 210, cluster worker system 212, cluster worker system 214, and cluster worker system 216) in an order indicated by the linking instructions. The data output by one code segment is stored using linking storage 202 and then subsequently used as input by another code segment. The code segments can each be in a different supported coding language supported by the system.

Cluster computing system 200 includes a set of subsystems for executing data analysis software. Cluster master system 204 and a set of cluster worker systems (e.g., cluster worker system 210, cluster worker system 212, cluster worker system 214, and cluster worker system 216) function as a traditional cluster data processing system, executing cluster data processing software. Software written by an administrator or a cluster system user is executed by the cluster data processing system. Cluster computing system 200 implements a system for automated cluster execution support for diverse code sources using linking storage 202. An automated cluster execution support for diverse code sources application programming interface (e.g., API) is implemented by cluster master system 204. The automated cluster execution support for diverse code sources API includes code for accessing the functions of the automated cluster execution support for diverse code sources from each coding language that is supported. Using the API, a code segment is able to provide a data set to linking storage 202 or receive a data set from linking storage 202, enabling interconnection of code segments built using different coding languages.

Cluster master system 204 receives a cluster computing job from a user system or an administrator system, divides the cluster computing job into a set of cluster worker jobs, provides each of the cluster worker jobs to a cluster worker system (e.g., a cluster worker system as in cluster worker system 206), receives cluster worker job results, stores cluster worker job results (e.g., on a distributed storage system, on a database system, on linking storage 202, etc.), determines that a cluster computing job has been completed, stores a job completed indication, combines cluster worker job results to determine a cluster computing job result, provides the cluster computing job result, or performs any other appropriate cluster computing job action. Cluster master system 204 is implemented using one or more processors. Cluster computing system 200 additionally comprises linking storage 202. Linking storage system 202 comprises a storage system for storing cluster computing system data. Linking storage system 202 stores data output by a cluster worker system, data on linking storage system 202 is read by a cluster worker system, linking storage system 202 sends and/or receives data via a network (e.g., network 100 of FIG. 1), or linking storage 202 stores and/or provides any other appropriate data. In some embodiments, linking storage 202 includes a processor and one or more hard drive storage system. Each cluster worker system of cluster computing system 200 (e.g., cluster worker system 210, cluster worker system 212, cluster worker system 214, and cluster worker system 216) is implemented using one or more processors. In various embodiments, the elements of cluster computing system 200 are each implemented using their own processor, are each implemented using their own computing system, are each implemented using a multiprocessor computing system, are combined onto a single processor, or are combined onto a plurality of processors in any other appropriate way.

Figure 3:
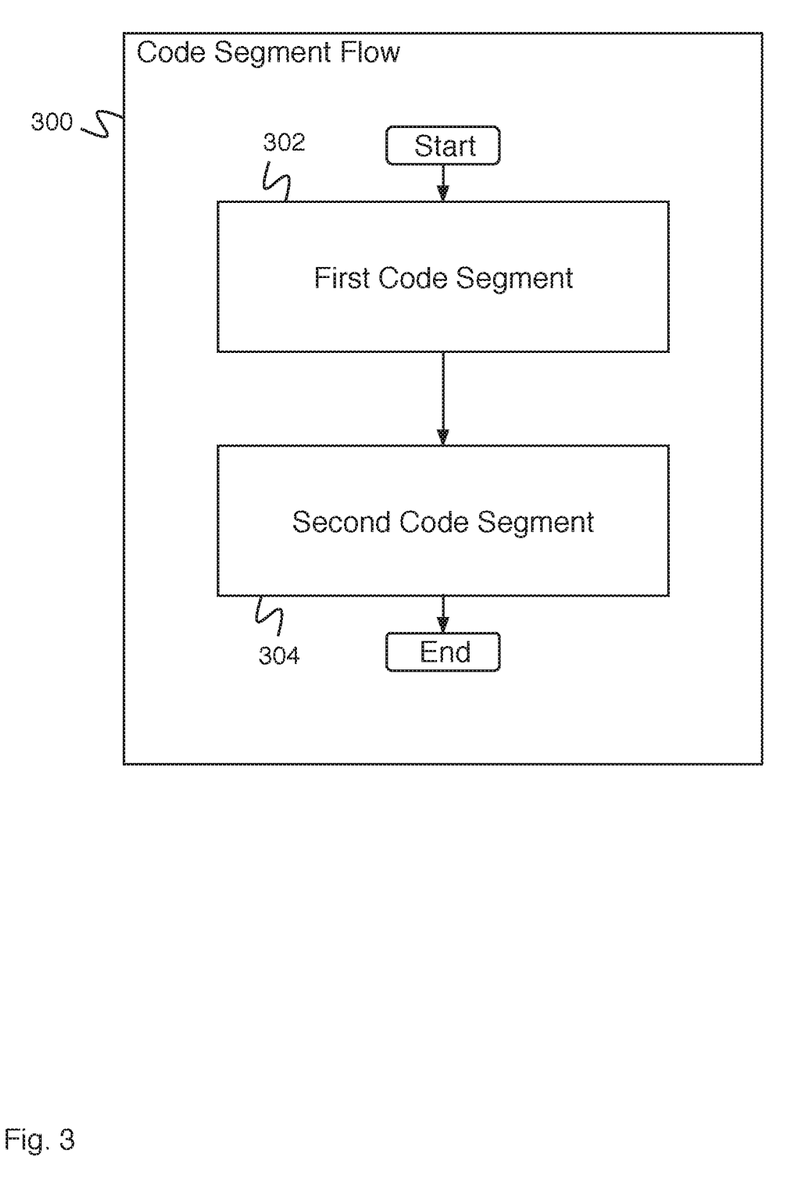
FIG. 3 is a diagram illustrating an embodiment of a code segment flow.

FIG. 3 is a diagram illustrating an embodiment of a code segment flow. In some embodiments, code segment flow 300 is executed by cluster system 200 of FIG. 2. In the example shown, code segment flow 300 is a code segment flow indicated by a connection indication provided to the system for automated cluster execution support for diverse code sources (e.g., a connection indication that indicates the output connection of first code segment 302 to the input connection of second code segment 304). Code segment flow 300 specifies a flow of execution of code segments—for example, the order of code segment execution as well as the connectivity (e.g., the output of a code segment being used as an input for another code segment. In the example shown, first code segment 302 is executed by a cluster system and the resulting output data is stored using the data storage method of an API for the coding language of first code segment 302. The output data is stored in a linking storage. Second code segment 304 is executed by the cluster system, which retrieves data stored in the linking storage by first code segment 302 using a data retrieval method of an API for the coding language of second code segment 304.

In the example shown, code segment flow 300 comprises first code segment 302 and second code segment 304. Executing code segment flow 300 comprises executing first code segment 302 followed by second code segment 304. First code segment 302 and second code segment 304 comprise code segments written in the same or different programming languages. In various embodiments, first code segment 302 and/or second code segment 304 comprise code segments written in python, R, hive, scala, a shell scripting language, e.g., sh, bash, etc., or any other appropriate programming language. Code segment flow 300 is executed by a master system (e.g., cluster master system 204 of FIG. 2). A master system executing code segment flow 300 causes first code segment 302 and second code segment 304 to be executed in the appropriate order as indicated using a connector indication. Causing code segments to be executed comprises causing code segments to be executed by a worker system (e.g., cluster worker system 206 of FIG. 2). Data output from first code segment 302 is received as input by second code segment 304. Data output from first code segment 302 is stored in a linking storage (e.g., linking storage 202 of FIG. 2). Data input to second code segment 304 is received from the linking storage. In some embodiments, code segment flow 300 additionally comprises a resource configuration associated with first code segment 302 and/or second code segment 304 (e.g., a cluster resource configuration requested for the execution of a code segment). In some embodiments, code segment flow 300 does not include resource configuration information associated with a code segment and in these cases the cluster resource configuration is either set to a default configuration or an automatic determination is made to set cluster resource configuration.

Figure 4:
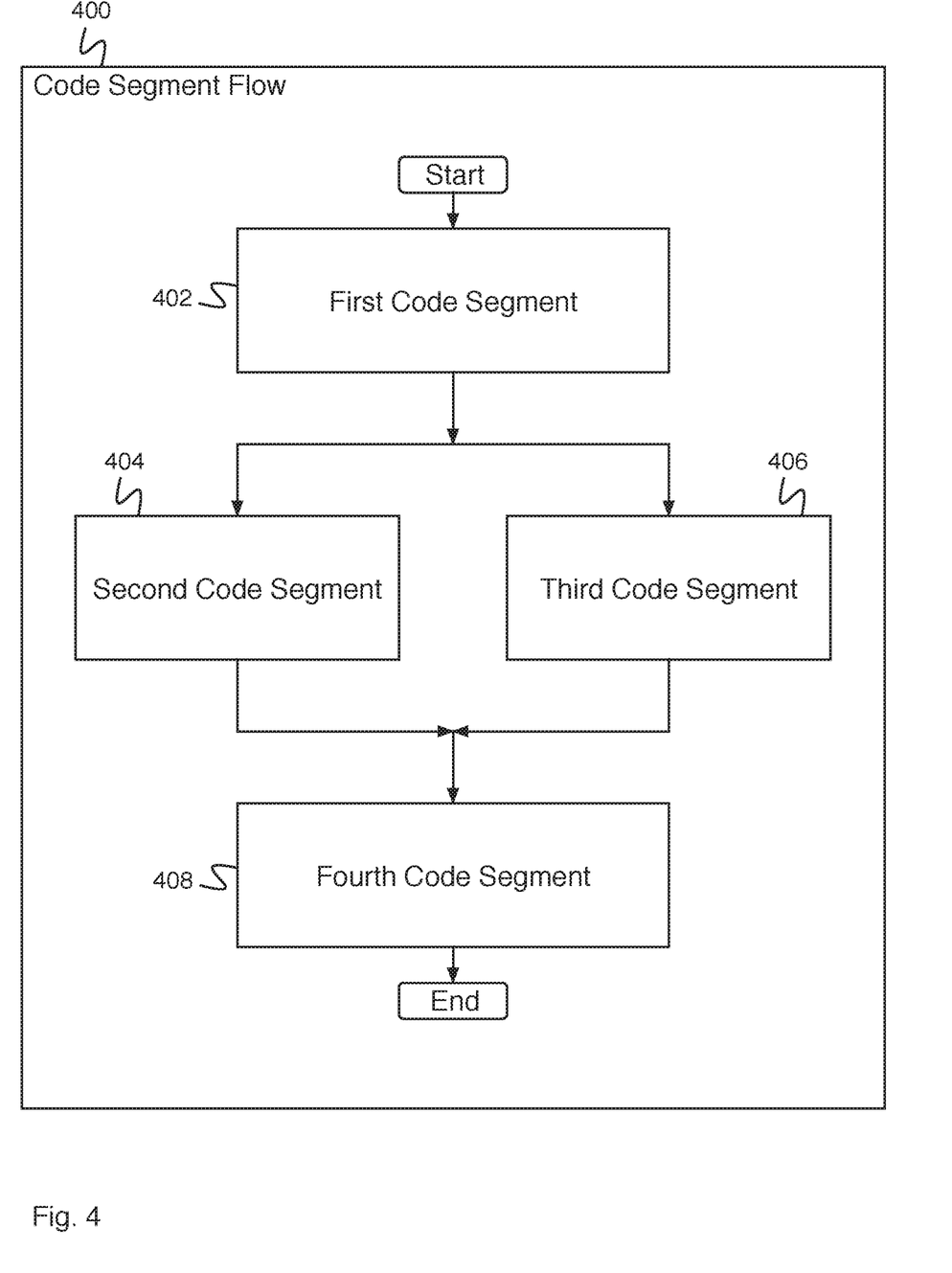
FIG. 4 is a diagram illustrating an embodiment of a code segment flow.

FIG. 4 is a diagram illustrating an embodiment of a code segment flow. In some embodiments, code segment flow 400 is executed by cluster system 200 of FIG. 2. In the example shown, code segment flow 400 is a code segment flow indicated by a connection indication provided to the system for automated cluster execution support for diverse code sources (e.g., a connection indication that indicates the output connection of first code segment 402 to the input connection of second code segment 404 and the input connection of third code segment 406 and that indicates the output connection of second code segment 404 and the output connection of third code segment 406 to the input connection of fourth code segment 408). Code segment flow 400 specifies a flow of execution of code segments—for example, the order of code segment execution as well as the connectivity (e.g., the output of a code segment being used as an input for another code segment. In the example shown, first code segment 402 is executed by a cluster system and the resulting output data is stored using the data storage method of an API for the coding language of first code segment 402. The output data is stored in a linking storage. Second code segment 404 and third code segment 406 are executed by the cluster system, which retrieve data stored in the linking storage by first code segment 402 using a data retrieval method of an API for the coding language of second code segment 404 and the data retrieval method of an API for the coding language of third code segment 406. The output of second code segment 404 and output of third coding segment 406 are stored in a linking storage. The output stored in the linking storage are input to fourth code segment 408 from linkage storage. Fourth code segment 408 is executed using the combined input as specified by a connection indication (e.g., concatenated, serialized, interdigitated, etc.).

In the example shown, code segment flow 400 comprises first code segment 402, second code segment 404, third code segment 406, and fourth code segment 408. Executing code segment flow 400 comprises executing first code segment 402 followed by executing second code segment 404 and third code segment 406, followed by executing fourth code segment 408. First code segment 402, second code segment 404, third code segment 406, and fourth code segment 408 comprise code segments written in the same or different programming languages. In various embodiments, first code segment 402, second code segment 404, third code segment 406, and fourth code segment 408 comprise code segments written in python, R, hive, scala, a shell scripting language, e.g., sh, bash, etc., or any other appropriate programming language. Code segment flow 400 is executed by a master system (e.g., cluster master system 204 of FIG. 2). A master system executing code segment flow 400 causes first code segment 402, second code segment 404, third code segment 406, and fourth code segment 408 to be executed. In some embodiments, causing code segments to be executed comprises causing code segments to be executed by a worker system (e.g., cluster worker system 206 of FIG. 2).

In the example shown, data output from first code segment 402 is received as input by second code segment 404 and by third code segment 406. Data output from first code segment 402 is stored in a linking storage (e.g., linking storage 202 of FIG. 2). Data input to second code segment 404 and third code segment 406 is received from the linking storage. Second code segment 404 and third code segment 406 are executed by worker systems. Second code segment 404 and third code segment 406 are executed by separate worker systems in parallel (e.g., at the same time). Data output by second code segment 404 and third code segment 406 is stored in the linking storage. Data input to fourth code segment 408 is received from the linking storage. Data output by second code segment 404 and third code segment 406 are combined. In various embodiments, data output by second code segment 404 and third code segment 406 are separately input to fourth code segment 408, combined using concatenation, combined using a sort operation, combined using a table join, combined using an inner product, or combined in any other appropriate way. In some embodiments, code segment flow 400 additionally comprises a resource configuration associated with first code segment 402, second code segment 404, third code segment 406, and/or fourth code segment 408 (e.g., a cluster resource configuration requested for the execution of a code segment). In some embodiments, code segment flow 400 does not include resource configuration information associated with a code segment and in these cases the cluster resource configuration is either set to a default configuration or an automatic determination is made to set cluster resource configuration.

Figure 5:
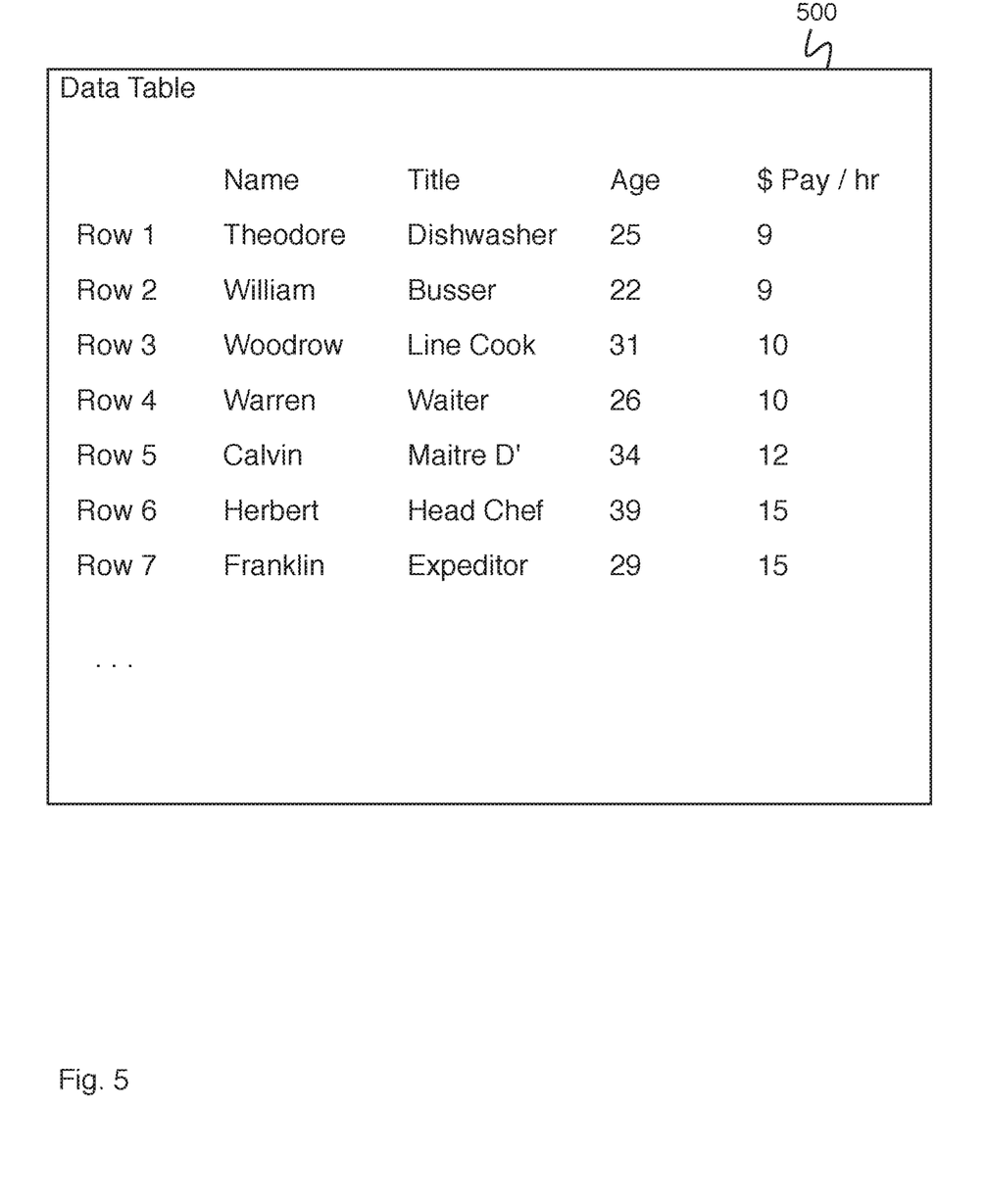
FIG. 5 is a diagram illustrating an embodiment of a data table.

FIG. 5 is a diagram illustrating an embodiment of a data table. In the example shown, data table 500 represents a data table output by a code segment (e.g., first code segment 302 of FIG. 3). Data table 500 shows an example data set, including a set of rows, each row including data corresponding to a set of column titles. Data table 500 includes columns for row numbers, names, titles, ages, and $ pay/hr. Row 1 includes column entries: row 1, Theodore, dishwasher, 25, and 9. Row 2 includes column entries: row 2, William, busser, 22, and 9. Row 3 includes column entries: row 3, Woodrow, line cook, 31, and 10. Row 4 includes column entries: row 4, Warren, waiter, 26, and 10. Row 5 includes column entries: row 5, Calvin, maître d', 34, and 12. Row 6 includes column entries: row 6, Herbert, head chef, 39, and 15. Row 7 includes column entries: row 7, Franklin, expeditor, 29, and 15. Code segments comprising portions of a code segment flow provide and receive intermediate data in the form of data table 500.

In the example shown, data table 500 includes a set of column titles. Data table 500 additionally comprises a set of rows. Each row comprises a set of data for each column (e.g., an entry associated with each column title). In some embodiments, a row comprises a data frame. In some embodiments, a set of rows comprises a data frame. Data table 500 is stored in a linking storage (e.g., linking storage 202 of FIG. 2). Data table 500 is identified by a filename, an identifier that is stored in the filename, a metadata identifier, a directory location, or any other appropriate identifying information. Data table 500 is read as input by a code segment. In some embodiments, two or more data tables are combined as input to a code segment.

Figure 6:
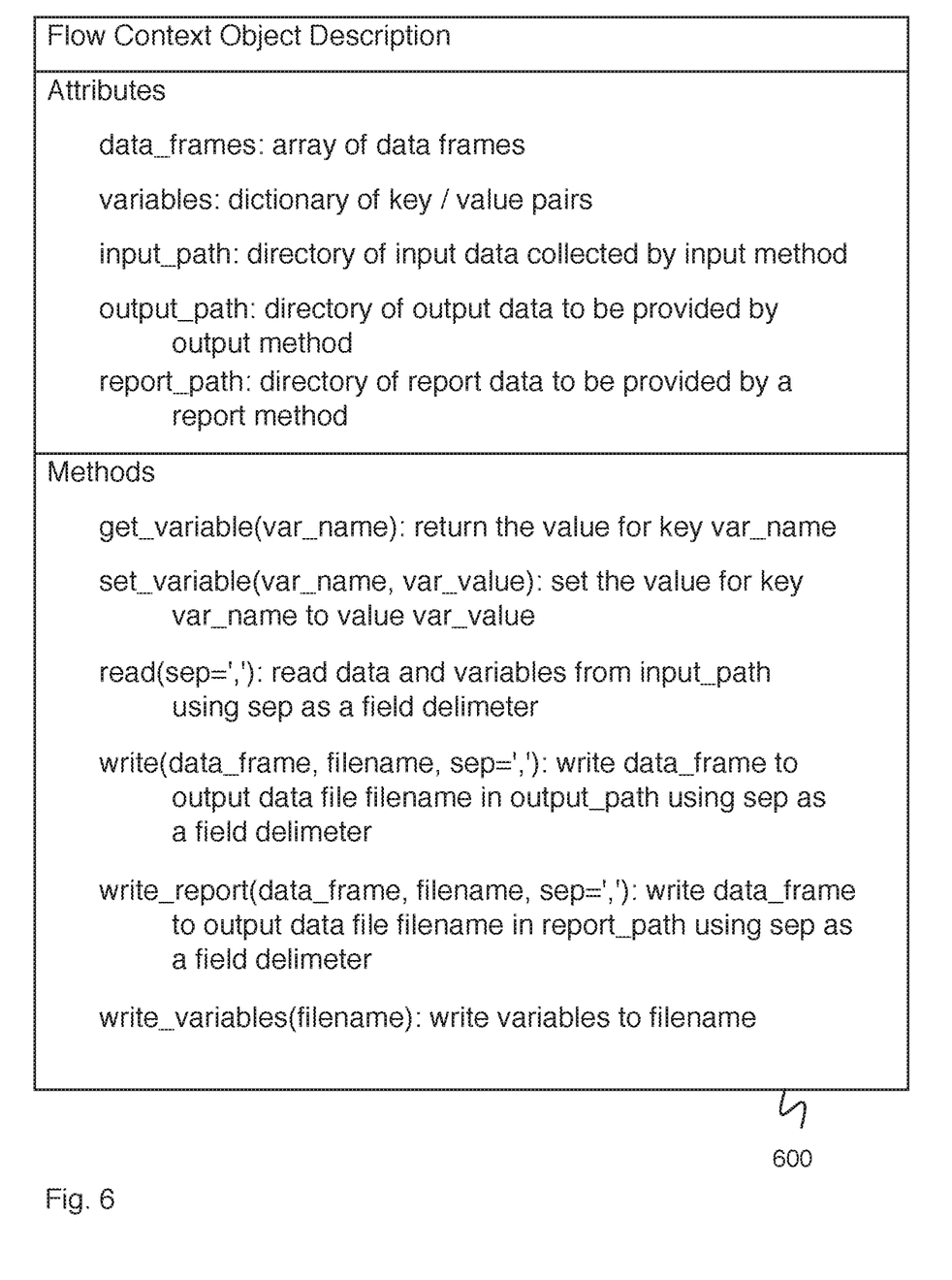
FIG. 6 is a diagram illustrating an embodiment of an object description.

FIG. 6 is a diagram illustrating an embodiment of an object description. In the example shown, code segments use a set of methods that are each available within each supported code language. The set of methods enable a code segment to output data or to input data in a commonly agreed manner. The set of methods include a method to return the value of a variable (e.g., get_variable that returns a value for the key var_name); a method to set the value of a variable (e.g., set_variable that sets a value for the key var_name to the value var_value); a method to read data (e.g., read that reads data and variables from an input path with a defined delimeter sep); a method to write data (e.g., write that writes data to a file in an output location with a delimeter sep); a method to write a report (e.g., write_report that writes data to a report file in a report location with a delimeter sep); and method to write variables (e.g., write_variables that writes variables to a file name). The data is stored in a linking storage (e.g., data stored in files in locations within the linking storage). The set of methods make a library of functions that are an application programming interface (API) in each supported language. The APIs are callable from within each language and within each code segment.

In some embodiments, flow context object description 600 comprises an object description of a flow context object for providing a flow context for a code segment. Flow context object description 600 comprises an API implementing automated cluster execution support for diverse code sources. The API is implemented in each coding language supported by the system for automated cluster execution support for diverse code sources and provides access to the necessary functions. For example, the API implements a function for storing a data table comprising intermediate data to a linking storage and a function for retrieving a data table comprising intermediate data from a linking storage.

The flow context provides method for storing and/or retrieving data from a linking storage system. Flow context object description 600 comprises a description of an implementation of a flow context API. The flow context API is implemented for each programming language available for code segments of a code segment flow (e.g., python, R, hive, scala, a shell scripting language, e.g., sh, bash, etc.). In the example shown, flow context object description 600 comprises a set of attributes and a set of methods. Attributes shown in flow context object description 600 comprise "data_frames", an array of data frames; "variables", a dictionary of key/value pairs; "input_path", a directory of input data collected by an input method; "output_path", a directory of output data to be provided by an output method; and "report_path", a directory of report data to be provided by a report method. Methods shown in flow context object description 600 comprise "get_variable", taking an input var_name and returning the value for the key var_name; "set_variable", taking inputs var_name and var_value and setting the value for key var_name to value var_value; "read", taking an input sep and reading data and variables from input_path using sep as a field delimeter; "write", taking inputs data_frame, filename, and sep, and writing data_frame to output data file filename in output_path using sep as a field delimeter; "write_report", taking inputs data_frame, filename, and sep, and writing data_frame to output data file filename in report_path using sep as a field delimeter; and "write_variables", taking as input a filename and writing variables to filename. Paths input_path, output_path, and report_path comprise paths on a linking storage system where the paths are temporary data storage paths (e.g., data is only temporarily stored at those paths). In contrast, report_path comprises a long-term storage path (e.g., data is not only temporarily stored at report_path).

Figure 7:
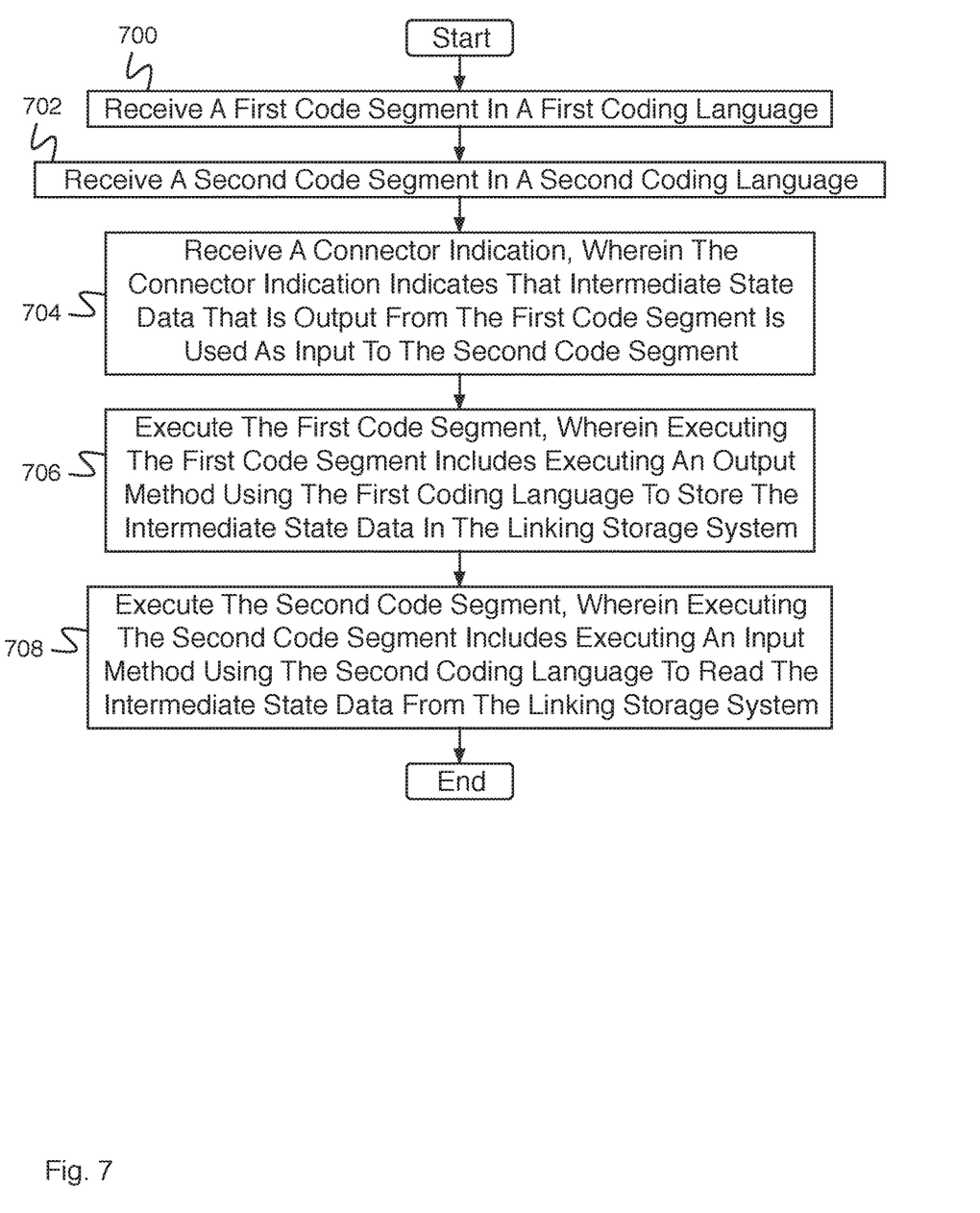
FIG. 7 is a flow diagram illustrating an embodiment of a process for automated cluster execution support for diverse code sources.

FIG. 7 is a flow diagram illustrating an embodiment of a process for automated cluster execution support for diverse code sources. In some embodiments, the process of FIG. 7 is executed by a cluster computing system (e.g., cluster computing system 104 of FIG. 1). In the example shown, in 700, a first code segment in a first coding language is received. In 702, a second code segment in a second coding language is received. In 704, a connector indication is received, wherein the connector indication indicates that intermediate state data that is output from the first code segment is used as input to the second code segment. For example, the connector is received that describes the ways the code segments are interlinked (e.g., the sequence of execution, the mapping of the inputs and the outputs of each code segment and where they come from and where they go to, etc.) and what order the code segments are executed (e.g., a code segment flow). In 706, the first code segment is executed, wherein executing the first code segment includes executing an output method using the first coding language to store the intermediate state data in the linking storage system. For example, the first code segment is caused to be executed (e.g., a cluster master system causes the code segment to be executed using a cluster worker system) and the code segment includes a call to an output method in the first code segment language that outputs data via an API to store the output data in a linkage storage. In 708, the second code segment is executed, wherein executing the second code segment includes executing an input method using the second coding language to read the intermediate state data from the linking storage system.

In some embodiments, instead of receiving the code segment flow as part of a connector indication, the connector indication comprises instructions for creating a code segment flow. In some embodiments, a connector indication indicates a resource configuration associated with the first code segment or the second code segment. In some embodiments, the connector indication does not provide resource configurations for executing the code segments and instead the resource configurations are set to a default configuration or are automatically determined by the system. In various embodiments, intermediate state data comprises a set of data, an array of data, a table of data, a data frame, a set of one or more data frames, state variables, state variable values, or any other appropriate collection of data. In some embodiments, intermediate state data is stored. In some embodiments, the intermediate state data is stored in a format that is common to the output method and input method called to intermediate data transfer from the first code segment to the second code segment (e.g., the intermediate state data is stored in comma-separated value format). In some embodiments, intermediate state data comprises a large array of data (e.g., "big data"). In various embodiments, intermediate state data comprises header information (e.g., a set of data column names), an index function, a database schema, data structuring information, or any other appropriate intermediate state data information. In some embodiments, intermediate state data comprises a process identifier (e.g., associated with a code segment flow, associated with an execution of the first code segment, etc.). In some embodiments, the input method implements an input method of a flow context application programming interface.

Figure 8:
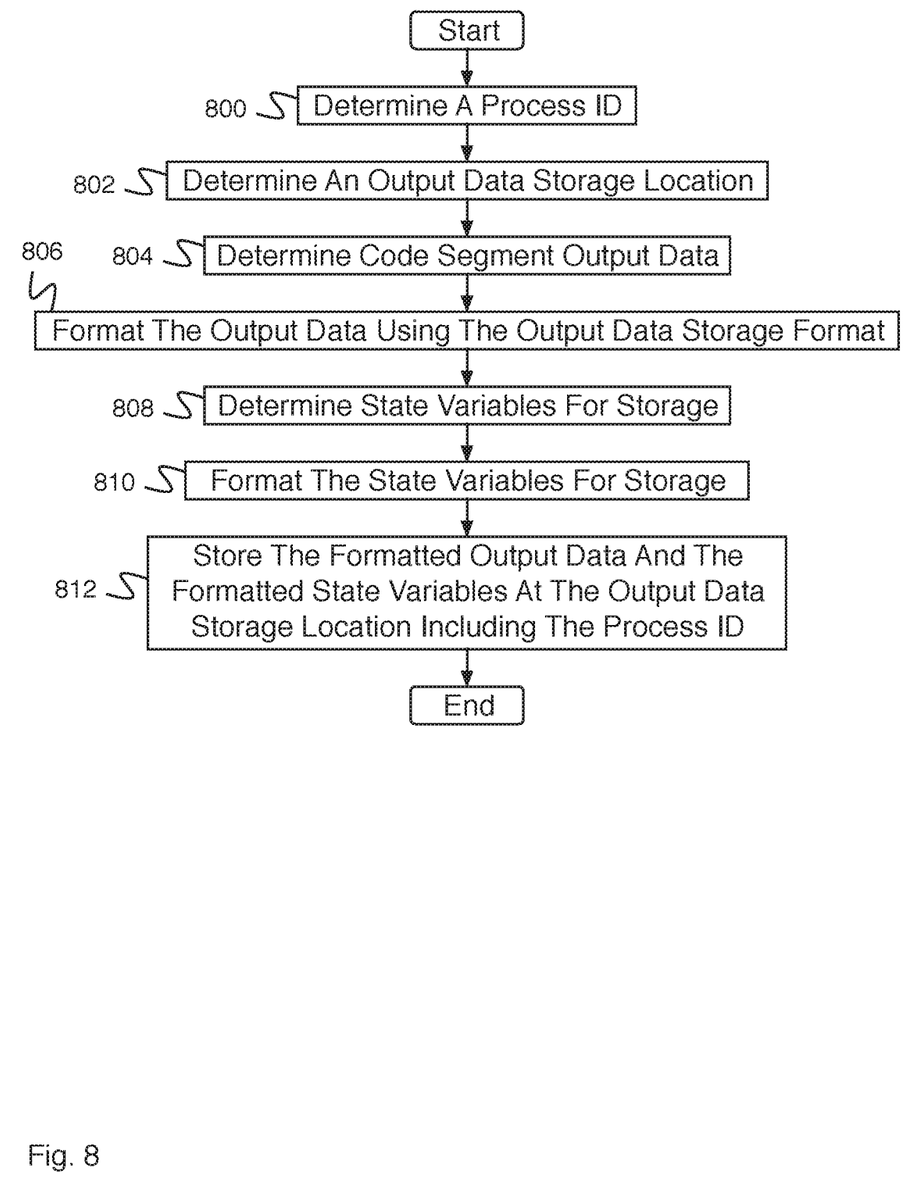
FIG. 8 is flow diagram illustrating an embodiment of a process for storing intermediate state data in a linking storage system.

FIG. 8 is flow diagram illustrating an embodiment of a process for storing intermediate state data in a linking storage system. In some embodiments, the process of FIG. 8 implements a portion of 706 of FIG. 7. In the example shown, in 800, a process ID is determined. In some embodiments, a process ID comprises a process ID associated with an execution of a code segment flow. In 802, an output data storage location is determined. In 804, code segment output data is determined. In 806, the output data is formatted using the output data storage format. In 808, state variables for storage are determined. In 810, the state variables are formatted for storage. In 812, the formatted output data and the formatted state variables are stored at the output data storage location including the process ID.

Figure 9:
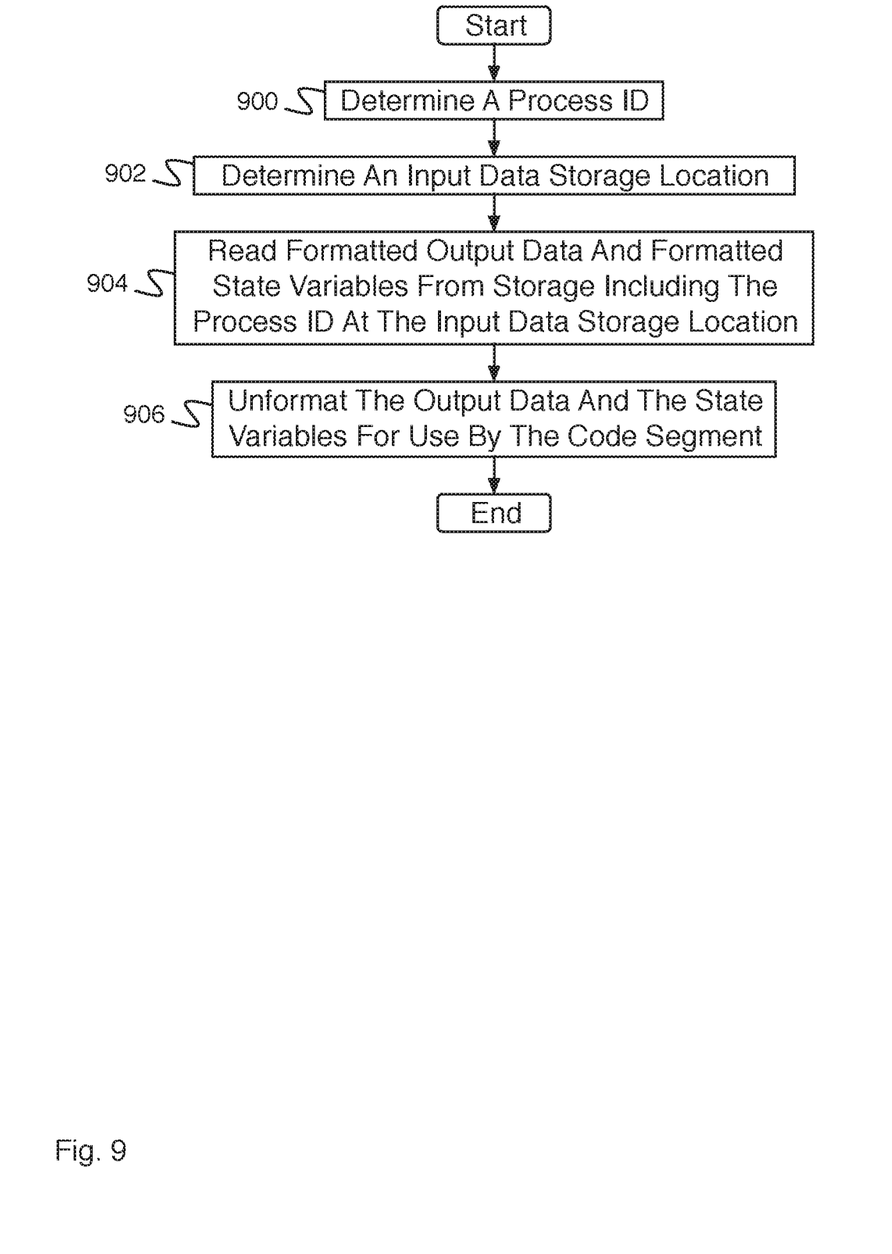
FIG. 9 is a flow diagram illustrating an embodiment of a process for reading intermediate state data from a linking storage system.

FIG. 9 is a flow diagram illustrating an embodiment of a process for reading intermediate state data from a linking storage system. In some embodiments, the process of FIG. 9 implements a portion of 708 of FIG. 7. In the example shown, in 900, a process ID is determined. In 902, an input data storage location is determined. In 904, formatted output data and formatted state variables are read from storage including the process ID at the input data storage location. In 906, the output data and the state variables are unformatted for use by the code segment.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for automated cluster execution support, comprising:
an interface configured to:
receive a plurality of code segments and a connector indication, wherein the plurality of code segments includes at least a first code segment configured to perform a first data processing task in a first coding language, a second code segment configured to perform a second data processing task in a second coding language, a third code segment configured to perform a third data processing task in a third coding language, and a fourth code segment configured to perform a fourth data processing task in a fourth coding language, wherein the first coding language is different from the second coding language, wherein the connector indication indicates that an intermediate state data that is output from the first code segment is additionally used as input to the third code segment, and wherein the connector indication comprises instructions for creating a code segment flow;
a linking storage system; and
a processor configured to:
build the code segment flow based at least in part on the connector indication, wherein the code segment flow comprises a flow of execution of the plurality of code segments; and
cause execution of the code segment flow, comprising to:
cause execution of the first code segment using the first coding language to obtain a first data set;
cause execution of an output method using the first coding language, wherein execution of the output method comprises to:
format the first data set generated by the first code segment to obtain the intermediate state data; and
store the intermediate state data and a process identifier in the linking storage system;
cause execution of an input method using the second coding language, wherein execution of the input method comprises to:
retrieve the intermediate state data from the linking storage system based at least in part on the process identifier; and
unformat the intermediate state data to obtain a second data set;
cause execution of the second code segment using the second coding language and the second data set to obtain an intermediate state data;
merge the intermediate state data that is output from the second code segment and an intermediate state data that is output from the third code segment to obtain a merged intermediate state data;
store the merged intermediate state data in the linking storage system; and
cause execution of an input method using the fourth coding language of the fourth code segment, comprising to retrieve the merged intermediate state data from the linking storage system.

2. The system of claim 1, wherein the first coding language, the second coding language, the third coding language, and the fourth coding language comprise one of: python, R, scala, hive, java, sh, bash, and javascript.

3. The system of claim 1, wherein the output method implements the output method of a flow context application programming interface.

4. The system of claim 3, wherein the input method implements the input method of the flow context application programming interface.

5. The system of claim 1, wherein the intermediate state data comprises an array of data.

6. The system of claim 5, wherein the array of data is stored in comma separated value format.

7. The system of claim 1, wherein the intermediate state data comprises a large array of data.

8. The system of claim 1, wherein the intermediate state data comprises header information.

9. The system of claim 8, wherein the header information comprises a set of data column names.

10. The system of claim 8, wherein the header information comprises an index function.

11. The system of claim 1, wherein the intermediate state data comprises a database schema.

12. The system of claim 1, wherein the intermediate state data comprises the process identifier.

13. The system of claim 12, wherein the execution of the first code segment is associated with the process identifier.

14. The system of claim 1, wherein the intermediate state data comprises one or more data frames.

15. The system of claim 1, wherein the intermediate state data comprises state variables.

16. The system of claim 1, wherein the intermediate state data comprises state variable values.

17. The system of claim 1, wherein executing the first code segment and the second code segment comprises indicating to execute the first code segment and the second code segment using a cluster system.

18. The system of claim 1, wherein the connector indication indicates a resource configuration associated with the first code segment or the second code segment.

19. The system of claim 1, wherein the first code segment includes a call to the output method.

20. The system of claim 1, wherein the second code segment includes a call to the input method.

21. A method for automated cluster execution support, comprising:
receiving a plurality of code segments and a connector indication, wherein the plurality of code segments includes at least a first code segment configured to perform a first data processing task in a first coding language, a second code segment configured to perform a second data processing task in a second coding language, a third code segment configured to perform a third data processing task in a third coding language, and a fourth code segment configured to perform a fourth data processing task in a fourth coding language, wherein the connector indication comprises instructions for creating a code segment flow, wherein the first coding language is different from the second coding language, and wherein the connector indication indicates that an intermediate state data that is output from the first code segment is additionally used as input to the third code segment;

building the code segment flow based at least in part on the connector indication, wherein the code segment flow comprises a flow of execution of the plurality of code segments; and causing execution of the code segment flow, comprising:
  causing execution of the first code segment using the first coding language to obtain a first data set;
  causing execution of an output method using the first coding language, wherein execution of the output method comprises:
    formatting the first data set generated by the first code segment to obtain the intermediate state data; and
    storing the intermediate state data and a process identifier in a linking storage system;
  causing execution of an input method using the second coding language, wherein execution of the input method comprises to:
    retrieving the intermediate state data from the linking storage system based at least in part on the process identifier; and
    unformatting the intermediate state data to obtain a second data set; and
  causing execution of the second code segment using the second coding language and the second data set to obtain an intermediate state data;
  merging the intermediate state data that is output from the second code segment and an intermediate state data that is output from the third code segment to obtain a merged intermediate state data;
  storing the merged intermediate state data in the linking storage system; and
  causing execution of an input method using the fourth coding language of the fourth code segment, comprising to retrieve the merged intermediate state data from the linking storage system.

22. A computer program product for automated cluster execution support, the computer program product being embodied in a non-transitory computer readable storage medium and comprising computer instructions for:
  receiving a plurality of code segments and a connector indication, wherein the plurality of code segments includes at least a first code segment configured to perform a first data processing task in a first coding language, a second code segment configured to perform a second data processing task in a second coding language, a third code segment configured to perform a third data processing task in a third coding language, and a fourth code segment configured to perform a fourth data processing task in a fourth coding language, wherein each of the plurality of code segments is configured to perform a corresponding data processing task, wherein the first coding language is different from the second coding language, and wherein the connector indication comprises instructions for creating a code segment flow, and wherein the connector indication indicates that an intermediate state data that is output from the first code segment is additionally used as input to the third code segment;

building the code segment flow based at least in part on the connector indication, wherein the code segment flow comprises a flow of execution of the plurality of code segments; and causing execution of the code segment flow, comprising:
  causing execution of the first code segment using the first coding language to obtain a first data set;
  causing execution of an output method using the first coding language, wherein execution of the output method comprises:
    formatting the first data set generated by the first code segment to obtain the intermediate state data; and
    storing the intermediate state data and a process identifier in a linking storage system;
  causing execution of an input method using the second coding language, wherein execution of the input method comprises to:
    retrieving the intermediate state data from the linking storage system based at least in part on the process identifier; and
    unformatting the intermediate state data to obtain a second data set; and
  causing execution of the second code segment using the second coding language and the second data set to obtain an intermediate state data;
  merging the intermediate state data that is output from the second code segment and an intermediate state data that is output from the third code segment to obtain a merged intermediate state data;
  storing the merged intermediate state data in the linking storage system; and
  causing execution of an input method using the fourth coding language of the fourth code segment, comprising to retrieve the merged intermediate state data from the linking storage system.

* * * * *